Nov. 17, 1942.  C. F. ROBBINS ET AL  2,302,058
MARKING MACHINE
Filed Feb. 5, 1941  6 Sheets-Sheet 2
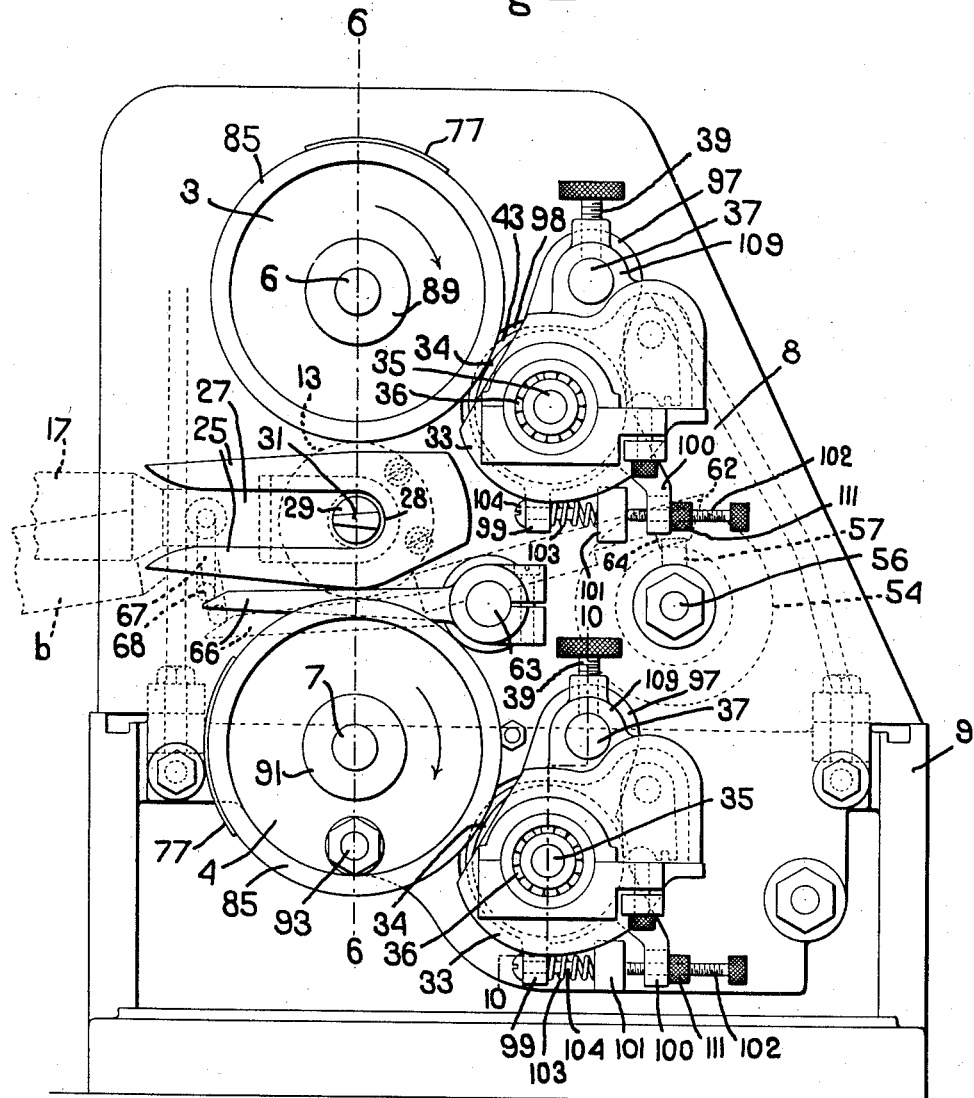
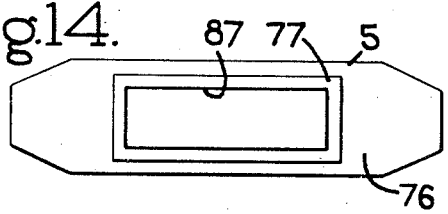
Inventors.
Charles F. Robbins
David F. Putnam
by Heard Smith & Tennant.
Attys.

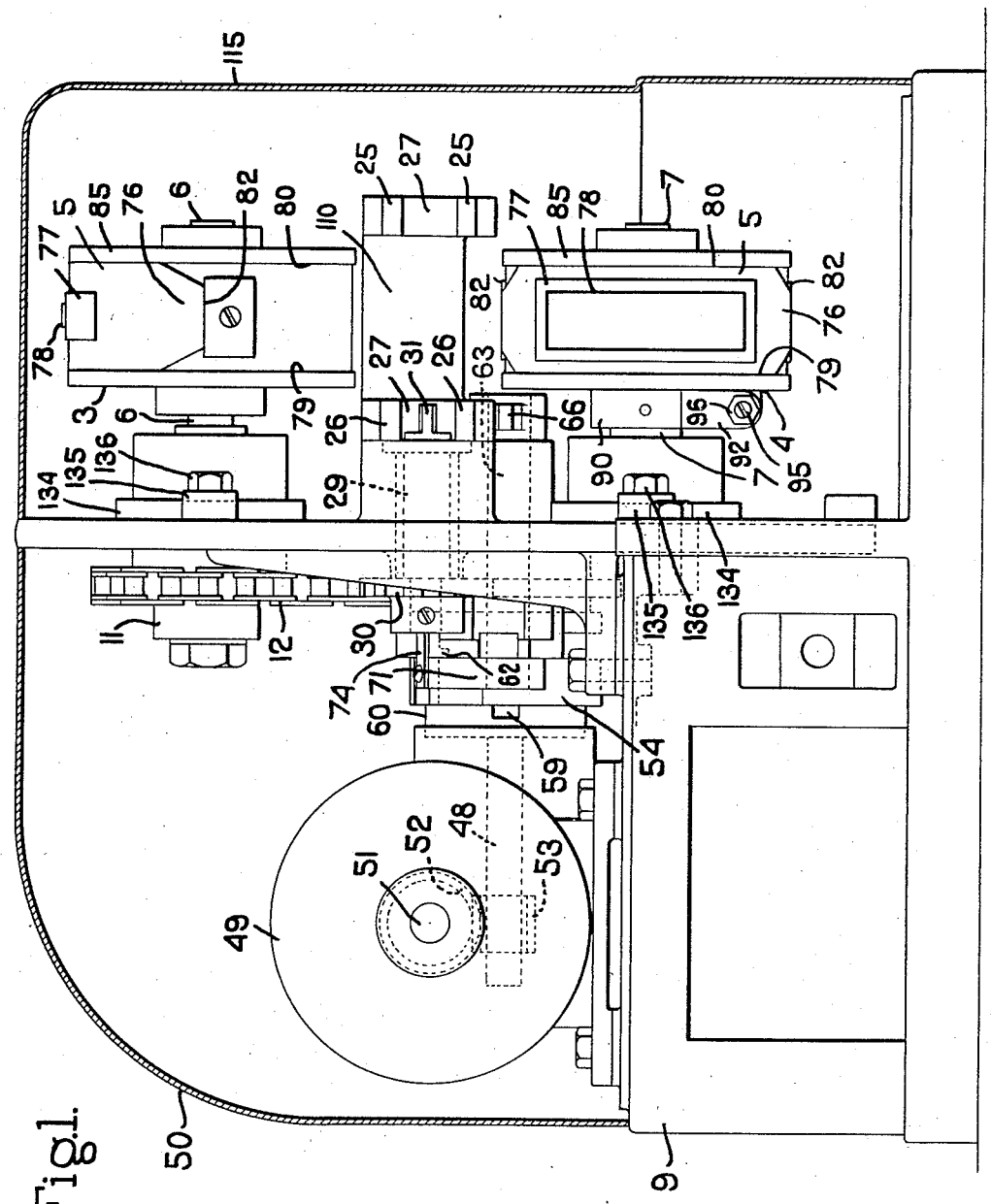

Nov. 17, 1942.  C. F. ROBBINS ET AL  2,302,058
MARKING MACHINE
Filed Feb. 5, 1941  6 Sheets-Sheet 3
Fig. 3.
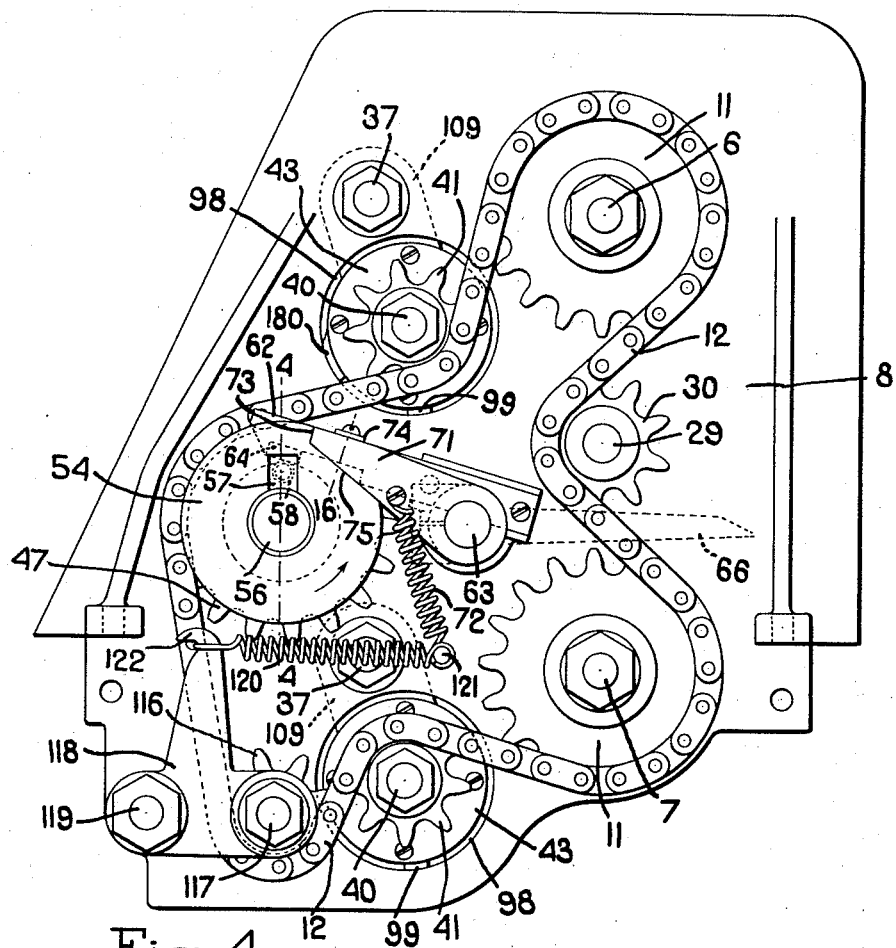
Fig. 4
Fig. 5.
Fig. 16.
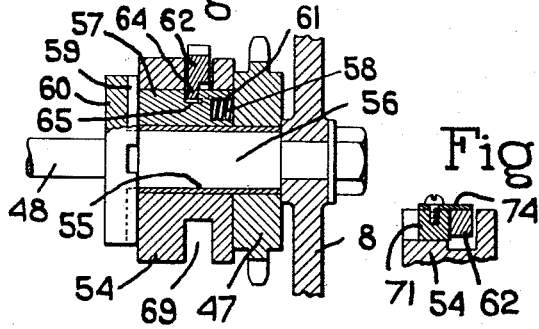
Inventors.
Charles F. Robbins
David F. Putnam
by Heard Smith & Tennant.
Attys.

Nov. 17, 1942.   C. F. ROBBINS ET AL   2,302,058
MARKING MACHINE
Filed Feb. 5, 1941   6 Sheets-Sheet 4
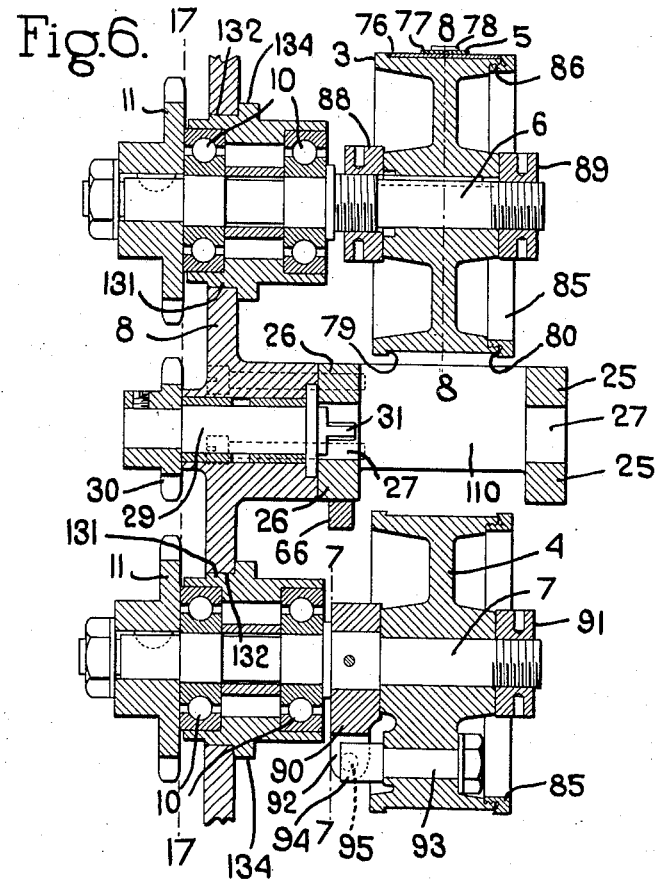
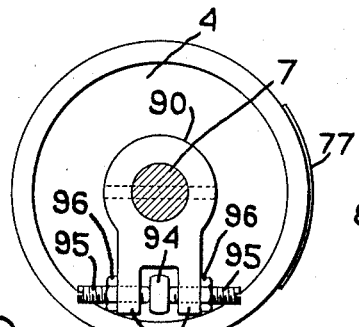
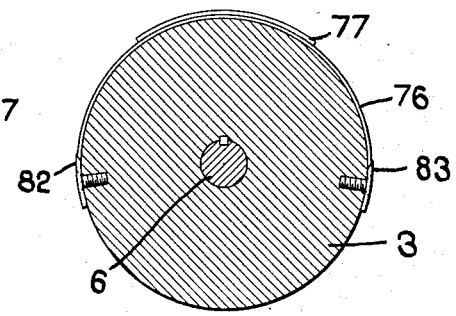
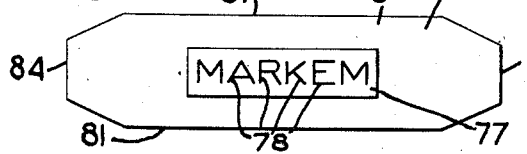
Inventors.
Charles F. Robbins
David F. Putnam
by Heard, Smith & Tennant.
Attys.

Nov. 17, 1942.    C. F. ROBBINS ET AL    2,302,058
MARKING MACHINE
Filed Feb. 5, 1941    6 Sheets-Sheet 5
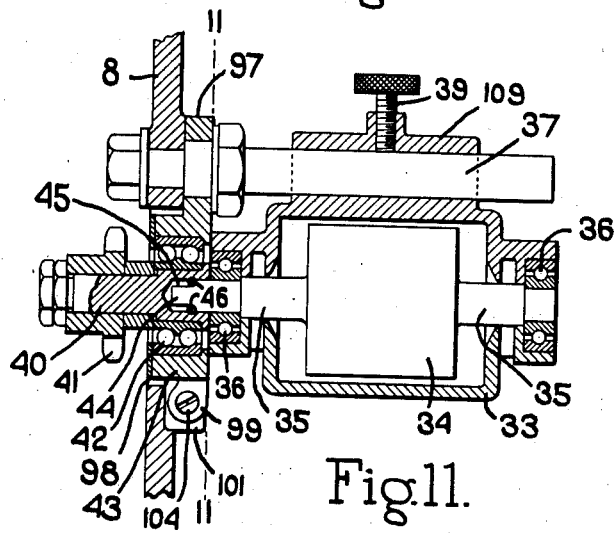
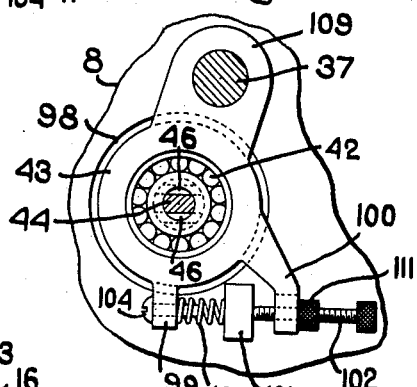
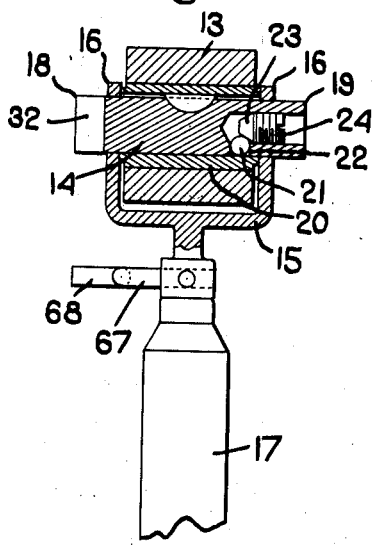
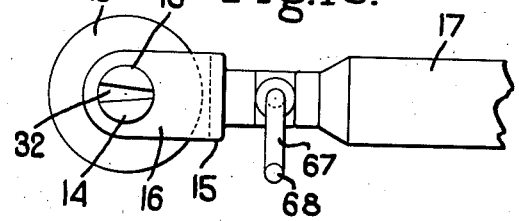
Inventors.
Charles F. Robbins
David F. Putnam
by Heard Smith & Tennant
Attys.

Inventors.
Charles F. Robbins
David F. Putnam
by Heard Smith & Tennant
Attys.

Patented Nov. 17, 1942

2,302,058

UNITED STATES PATENT OFFICE 2,302,058

MARKING MACHINE

Charles F. Robbins and David F. Putnam, Keene, N. H., assignors to Markem Machine Company, Keene, N. H., a corporation of New Hampshire Application February 5, 1941, Serial No. 377,446

7 Claims. (Cl. 101—154)

This invention relates to marking machines of that type in which the printed impression is applied to the work by a manually manipulated transfer roll which is separable from the other parts of the machine and which can be temporarily assembled with such other parts for the purpose of receiving an ink impression that is subsequently transferred to the work by the manual manipulation of the transfer roll.

The invention is in the nature of an improvement on the device illustrated in U. S. Patent No. 2,260,400, October 28, 1941.

The device illustrated in said patent comprises a type-carrying member mounted in a supporting frame and provided with type means to give the type-carrying member a cyclic movement by which the type is moved through a path that begins and ends at the same point, a transfer roll rotatably mounted in a holder therefor which is separable from the machine frame and is capable of being manually placed in the frame in an operative position in which said transfer roll is located to receive an ink impression from the type of the carrying member, and means to rotate the transfer roll when it is in its operative position thereby to provide a rolling contact between said roll and the type by which the latter lays an ink impression on the transfer roll, said holder being capable of being manually removed from the frame and manually manipulated to transfer the ink impression on the transfer roll to the article to be marked.

One of the objects of the present invention is to provide a novel marking machine of this type which is so constructed that the actuating means for giving the cyclic movement to the type-carrying member may be rendered operative by the holder after the latter has been placed in the machine to locate the transfer roll in a position to receive the ink impression from the type of the type-carrying member. As a result of this improvement, the operation of the machine involves merely the act of placing the holder in its operative position in the frame, and then giving said holder a slight rocking movement to set the actuating means for the type member and transfer roll in operation. This improvement eliminates any danger that the actuating means might be set in operation before the transfer roll is properly located in the machine to receive an ink impression.

Other objects of the invention are to improve generally marking machines of this type in the particulars hereinafter set forth.

In the drawings, wherein we have illustrated some embodiments of the invention:

Fig. 1 is a front view of a marking machine embodying our invention with the hood or casing broken out to better show the construction.

Fig. 2 is a view of the machine looking toward the left in Fig. 1 with the hood or casing removed.

Fig. 3 is a section on the line 3—3, Fig. 1, showing the actuating means for rotating the type-carrying members and the transfer roll.

Fig. 4 is a section on the line 4—4, Fig. 3.

Fig. 5 is a perspective view of the clutch pin used in the clutch shown in Fig. 4.

Fig. 6 is a section on the line 6—6, Fig. 2.

Fig. 7 is a section on the line 7—7, Fig. 6.

Fig. 8 is a section on the line 8—8, Fig. 6.

Fig. 9 shows a removable and interchangeable type member adapted to make a printed impression corresponding to part of the final printed impression that is applied to the work.

Fig. 10 is a section through the ink reservoir on the line 10—10, Fig. 2.

Fig. 11 is a section on the line 11—11, Fig. 10.

Fig. 12 is a view, partly in section, of the transfer roll and its holder.

Fig. 13 is a side view of the transfer roll and its holder.

Fig. 14 is a view of a removable and interchangeable type member designed to make a part of the final printed impression which, with the part made by the type member shown in Fig. 9, forms the complete impression.

Fig. 15 shows the final imprint on the work which is made from the type members illustrated in Figs. 9 and 14.

Fig. 16 is a section on the line 16—16, Fig. 3.

Figure 17:
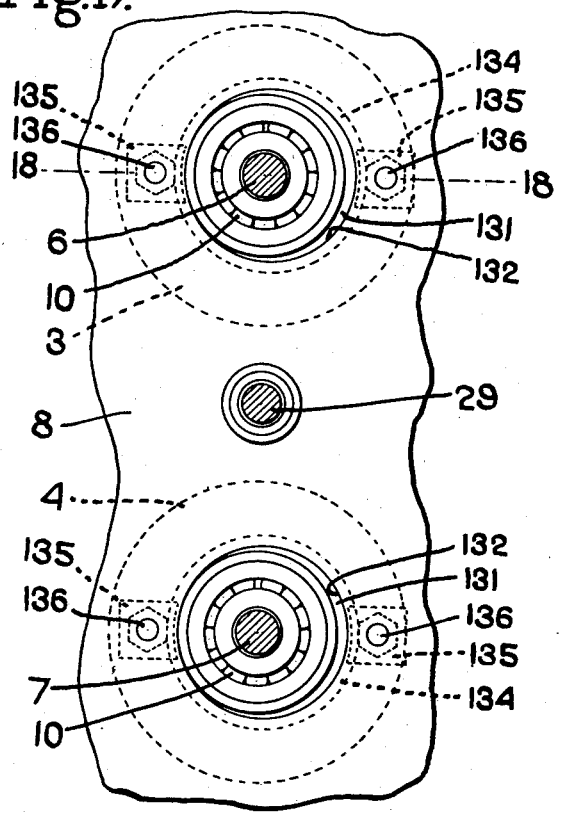
Fig. 17 is a section on the line 17—17, Fig. 6.

In the machine herein illustrated, as in that illustrated in said Patent No. 2,260,400, there are two rotary type-carrying members, one carrying type to make an impression corresponding to part of the complete final impression to be applied to the work, and the other carrying the type member adapted to make an ink impression corresponding to the other part of the complete final printed impression, the arrangement being such that when the transfer roll is inserted into the machine and the latter is set in operation, each type member lays on the transfer roll an ink impression, the two ink impressions forming together the complete impression which it is desired to transfer to the work.

The two rotary type-carrying members are indicated at 3 and 4, each member being in the form of a cylinder or roll adapted to receive on its periphery a type member 5.

These type-carrying members 3 and 4 are mounted on shafts 6 and 7 respectively which are journaled in the upright portions 8 of the machine frame 9, suitable ball bearings 10 being preferably provided for each shaft. These two shafts 6 and 7 are connected together so as to rotate in synchronism, and for this purpose each shaft is provided with a sprocket wheel 11 which meshes with and is driven by an endless sprocket chain 12.

The arrangement of and means for operating the sprocket chain will be presently described.

The transfer roll is indicated at 13 and it may be made of rubber, neoprene or any other suitable material. It is mounted on a shaft 14 which is rotatively carried by a holder 15, said holder having a forked construction provided with arms 16 in which the shaft 14 is journaled. This holder is provided with a suitable handle 17 by which it may be manually operated.

The shaft 14 is of sufficient length so that the ends 18 and 19 thereof project beyond the arms 16 of the holder for reasons presently to be described. In the construction shown in Fig. 12, the body 13 of the transfer roll is mounted on a sleeve 20 which is keyed to the shaft 14 so as to rotate therewith, and the sleeve and shaft are locked against relative movement in the direction of the shaft axis by means of a locking ball 21 which occupies an opening 22 formed in the shaft 14 and is engaged by the tapered end 23 of a screw 24 that occupies an internally screw-threaded recess formed in the end of the shaft 14. By advancing the screw 24, the locking ball 21 is crowded outwardly into clamping engagement with the interior of the sleeve 20, thereby locking the shaft 14 and sleeve 20 from relative movement in the direction of the shaft axis.

This holder 15 is separable from the machine frame 8, 9, but as stated above, it is adapted to be placed therein in a position in which the transfer roll will be properly located to receive an ink impression from the type carried by each of the type-carrying members or rolls 3 and 4. For this purpose, the frame is provided with two pairs of arms 25, 26, the arms of each pair forming between them an open-ended slot 27 adapted to receive one of the projecting ends of the shaft 14. The two pairs of arms 25, 26, are spaced apart a proper distance to receive between them the transfer roll and the operation of assembling the transfer roll with the other parts of the machine for the purpose of providing said roll with an ink impression involves simply inserting the projecting ends 18 and 19 of the shaft 14 into the open-ended guiding slots 27, and bottoming said projecting ends against the inner ends 28 of the slot, as shown in dotted lines in Fig. 2. When the projecting or trunnion ends 18 and 19 of the transfer roll shaft 14 rest against the bottom 28 of the guide slots 27, the transfer roll will be properly positioned to receive an ink impression from each type member as the type-carrying rolls are rotated.

Means are provided somewhat similar to that illustrated in the above mentioned Patent No. 2,260,400, by which when the transfer roll is thus inserted into the machine, the shaft 14 of the transfer roll will be automatically coupled to the actuating means for the type-carrying rolls 3 and 4, so that when the machine is set in operation, the transfer roll will rotate at the same surface speed as the type-carrying rolls, and during each rotation of each roll, the type member thereon will apply an ink impression to the transfer roll, with the result that when the machine is brought to rest after the completion of one cycle of operations, the transfer roll will carry an ink impression laid by each type member. Such ink impression is then transferred to the work by manually removing the holder and transfer roll from the machine, and applying the transfer roll to the work and rolling it over the surface of the work, which operation will transfer the ink impression from the transfer roll to the work as described in the above-mentioned Patent No. 2,260,400.

The transfer roll is driven from a shaft 29 that is journaled in the upright portion 8 of the frame and is provided with a sprocket wheel 30 which meshes with the sprocket chain 12, as shown in Fig. 3. One end of the shaft 29 is formed with a wedge-shaped clutch projection 31 adapted to enter a wedge-shaped recess 32 formed in the end 18 of the shaft 14 of the transfer roll. At the end of each operation, the machine is brought to rest with this web 31 occupying the horizontal position, shown in Fig. 2, the narrow edge of the wedge-shaped clutch projection being directed toward the open end of the slot 27. When the holder is inserted into the machine, this wedge enters the wedge-shaped slot 32 of the shaft 14, thereby coupling the transfer roll to the shaft 29, and when the machine is started up, the driving movement of the sprocket chain 12 serves to rotate both the type-carrying rolls and also the transfer roll.

The clutch device by which the sprocket chain 12 is set in operation will be presently described.

Means are provided for inking the type member carried by each type-carrying roll, there being one inking device for each roll. Such inking device comprises an ink reservoir 33 in which operates an inking roll 34, each ink reservoir being open at the side, and the ink roll 34 projected slightly through the open side, as shown in Fig. 2. Each ink roll is mounted on a shaft 35 which is journaled in bearings 36 carried by the ink reservoir, and each ink reservoir is detachably supported on a rod 37 carried by the portion 8 of the frame, a set screw 39 being used to lock the ink reservoir in its properly adjusted position. Each stud or shaft 37 is supported at one end in the frame 8, the other end being free so as to permit the ink reservoir to be removed from the shaft if it is desired to clean it or repair it or exchange it for another ink reservoir containing a different color of ink.

The inking roll 34 of each inking device is positively driven from the sprocket chain 12, each inking roll being rotated at the same surface speed as that of the type-carrying rolls 3 and 4. For this purpose, the shaft 35 of each inking roll is connected to and is driven by a shaft 40 carrying a sprocket wheel 41 that meshes with the sprocket chain 12, as best seen in Fig. 3. Each shaft 40 is rotatably mounted in bearings 42 that are mounted in a supporting bracket 43 that is adjustably secured to the frame, and a detachably driving connection between the shaft 40 and the inking roll shaft 35 is provided so as to permit the ink reservoir with its inking roll to be readily removed from the machine or replaced therein. As shown in Fig. 10, one end 44 of the inking roll shaft 35 is flat-sided and is adapted to enter a recess 45 with which the shaft 40 is provided. Situated in this recess are two parallel transversely extending pins 46 between which the flat-sided portion 44 of the ink roll shaft 35 is received. The shafts 40 and 35 are thus coupled together so that they rotate in unison, but the shaft 35 can readily be withdrawn from its coupled engagement with the shaft 40 by a movement in the direction of the length of the shaft. It will thus be seen that by simply loosening the clamping screw 39 for either ink reservoir, said reservoir with its inking roll can be removed from the machine, and an ink reservoir can be installed in the machine again by simply mounting the ink reservoir on its supporting stud 37, and at the same time entering the end of the shaft 35 into the recess 45 of the corresponding shaft 40.

From the above it will be seen that the sprocket chain 12 serves to drive not only the type-carrying rolls 3 and 4 but also the shaft 29 from which the transfer roll is operated as well as the inking rolls 34. Since these elements are all driven by the same sprocket chain, they will always be rotated in the proper timed relation with each other.

The sprocket chain 12 is driven from a sprocket wheel 47 which is adapted to be clutched to a power shaft 48, the latter being geared to and actuated by a motor 49 that is mounted on the frame and is located within the removable hood 50. The shaft 51 of the motor is connected by gears 52, 53 with the power shaft 48.

The clutch for connecting the power shaft 48 to the sprocket wheel 47 is adapted to be tripped or rendered operative by the holder 15 for the transfer roll after said holder has been placed in its operative position shown in Fig. 2 with the transfer roll in position to receive ink impressions from the type-carrying rolls 3 and 4.

The clutch which we prefer to use is a one-revolution clutch which, when tripped, will give one rotation to each of the type-carrying rolls 3 and 4 and will then be disengaged, thus bringing said rolls to rest ready for the next operation.

While any suitable one-revolution clutch may be employed, that we have shown comprises a clutch element 54 rigid with the sprocket wheel 47, both the clutch element and the sprocket wheel being shown as mounted on a sleeve 55 which is rotatably carried by a stud shaft 56 that is secured to the portion 8 of the frame.

This clutch element 54 carries a clutch pin 57 which is slidable in an axial direction and is normally acted on by a spring 58 which is located in a recess 61 formed in the end of the clutch pin and is backed by the sprocket wheel 47, said spring tending to move the clutch pin toward the left in Fig. 4 and into its operative position in which the left hand end thereof will engage in one of a plurality of radial recesses 59 formed in a clutch disk 60 that is rigid with the shaft 48. When the clutch is disengaged, the clutch pin is held in its retracted position shown in Fig. 4 by an arm 62 fast on a rock shaft 63 which is mounted in the upright portion 8 of the frame, said arm 62 having a fin 64 on its lower edge adapted to engage in a slot 65 formed in the upper side of the clutch pin 57, as shown in Fig. 4. The clutch is tripped by swinging the arm 62 upwardly, thereby to withdraw the fin from the slot 65, and when this is done, the spring 58 throws the clutch pin to the left, Fig. 4, so that the end thereof will engage in one of the clutch recesses 59 in the clutch disk 60, which it will be understood is being constantly rotated from the motor 49.

For thus tripping the clutch, the rock shaft 63 is provided with a trip arm 66 which is located directly beneath the pair of guiding arms 26, as shown in Fig. 1. The holder 15 for the transfer roll is provided with a clutch-actuating projection 67, the end 68 of which is situated directly over the end of the trip lever 66 when the holder is inserted into the machine and occupies its operative position, as shown in dotted lines in Fig. 2. When the holder has been thus placed in the machine and the transfer roll has been coupled to the shaft 29, the operator may then trip the clutch and set the machine in operation by swinging the handle of the holder downwardly into the dotted line position b, Fig. 2. This swinging movement causes the end 68 of the clutch-actuating protection 67 to bear downwardly on the end of the trip lever 66, thereby swinging the trip lever into the dotted line position, Fig. 2. By this means, the rock shaft 63 is rocked in a counter-clockwise direction, Fig. 2, thereby swinging the arm 62 upwardly and disengaging it from the clutch pin 57. When the arm is thus disengaged, the clutch pin is moved forwardly, as above described, into clutching engagement with the clutch disk 60, and the sprocket wheel 47 will thus be set in rotation and will give the sprocket chain 12 a forward feeding movement.

If in operating the machine the operator raises the handle of the holder 15 from the lower to the upper dotted line position, Fig. 2, as soon as the clutch has been tripped, the arm 62 will drop into the groove 69 of the clutch member 54, and as the clutch member completes its rotation, the fin 64 of the arm 62 will engage the inclined face 70 of the slot 65 in the clutch pin, thereby causing said clutch pin to be withdrawn from its clutching engagement with the disk 60 and rendering the clutch inoperative.

It is important that there should be no overrunning of the moving parts when the clutch is released, because it is essential that when the clutch is disengaged, the parts should be brought to rest with the shaft 29 in the angular position shown in Fig. 2 in order to permit the transfer roll to be disconnected from said shaft by withdrawing the holder from the guiding arms 24, 25, and also to permit the transfer roll to be properly coupled to the shaft 29 when the holder is inserted back into the machine.

As the fin 64 engages the inclined face 70 of the clutch pin, said pin will be moved backwardly until the end of the pin strikes the sprocket wheel 47. When the clutch pin does thus strike the sprocket wheel, it cannot be retracted further, and the portion of the clutch pin between the fin 64 and the sprocket wheel thus becomes wedged between these two parts, thus preventing any further rotation of said sprocket wheel. The clutch is provided with means to prevent recoil of the clutch member 54 due to any sudden stoppage thereof. This is accomplished by means of a dog 71 which is pivotally mounted on the shaft 63 and is acted on by a spring 72 and the end of which is adapted to engage a shoulder 73 formed by the end of the recess 75 with which the clutch member 54 is provided. This dog 71 lies along side of the arm 62 and is provided with a lateral projection 74 which overlies the arm 62.

When the clutch is tripped and the arm 62 is disengaged from the clutch pin 57, said arm, by its engagement with the projection 74, will raise the dog 71 against the action of the spring 72. When the tripping arm 66 is released, the arm 62 will drop back into position to engage the clutch pin as the clutch rotates, and the dog 71 will drop onto the periphery of the clutch member 54. By the time the clutch member has completed its rotation and has been disengaged from the driving member 60 and has been brought to rest as above described, the recess 75 in the clutch member 54 has been moved into a position underneath the end of the dog 71, and the shoulder 73 has been carried just beyond the end of said member. As soon as this happens, the spring 72 will swing the dog downwardly into the recess 75, as shown in Fig. 3, and the end of the dog thus cooperates with the shoulder 73 to prevent any backward or recoil movement of the clutch.

It will thus be observed that with the construction herein shown, the machine is set in operation by first introducing the transfer roll holder into the machine, as shown in Fig. 2, and then swinging said holder downwardly slightly, thereby to actuate the trip arm 66 and release the clutch. As soon as this occurs, the operator will raise the handle of the holder back into its upper dotted line position, Fig. 3, thereby permitting the arm 62 to function to disengage the clutch when it has completed its revolution. The driving sprocket wheel 54 has the same diameter as the sprocket wheels 11 by which the type-carrying rolls are operated so that during each rotation of the driving sprocket wheel 54 each of the type-carrying rolls will be given one rotation. The sprocket 30 that operates the shaft 29 is one-half the diameter of the other sprocket wheels, and, as a result, the transfer roll 13 will be given two rotations during each rotation of the type-carrying rolls.

As stated above, each type-carrying roll 3 and 4 carries a removable type member provided with type for making an ink impression corresponding to part of the final or complete impression which is to be printed on the work, the ink impressions made by the two type members forming the final or complete impression that is imprinted on the work.

In the construction herein shown, each type member 5 comprises a backing element 76 of flexible sheet material, preferably flexible sheet metal, and a type-carrying element 77, preferably of rubber, which is secured to the backing element 76 and which has the type 78 formed on its face.

In order to provide for readily attaching a type member 5 to either type-carrying roll or removing it therefrom, each roll is provided with two peripheral clamping shoulders 79 and 80 between which the side edges 81 of a type member may be clamped, and said roll is also provided with two undercut shoulders 82 and 83 adapted to engage the ends 84 of the backing element 76. Of the two peripheral clamping shoulders 79 and 80, the shoulder 79 is a fixed shoulder, while the shoulder 80 is adjustable toward and from the shoulder 79, thus providing for clamping or unclamping any backing member between the shoulders. The shoulder 80 is formed on a clamping ring 85 which is screw-threaded to the type-carrying roll, said ring having an exteriorly screw-threaded portion 86 adapted to engage interior screw-threads formed on the rim of the type-carrying roll.

In applying a type member 5 to the type-carrying roll, the clamping ring 85 will be backed off slightly and then the type member will be placed on the rolls and the ends 84 thereof inserted under the undercut shoulders 82, 83. While the type member is held in this position, the operator will screw up the clamping ring 85, thereby clamping the backing member 76 tightly between the clamping shoulders 79, 80.

The shoulders 82, 83, are in the nature of positioning shoulders, and it will be understood that they will be properly located so that the two type members, when secured to the type-carrying rolls 3 and 4, will be so positioned thereon that the two ink impressions which the two type members make on the transfer roll will be properly indexed and alined with each other to produce the complete or final ink impression that is to be applied to the work. If, for instance, the ink impression which is to be put on the work is the word "Markem" with a rectangular border surrounding it, as shown in Fig. 15 and with the word "Markem" printed in one color and the rectangular border printed in another color, then one of the type-carrying members 5 might carry the type for printing the word "Markem," as shown in Fig. 9, and the other type-carrying member might carry type which would print a rectangular border line 87, as seen in Fig. 14. The two type members are so positioned on the type-carrying rolls that when each has laid its ink impression on the transfer roll, the composite ink impression on said roll will consist of the word "Markem" surrounded by the rectangular border, and this is the ink impression that will be applied to the work.

If different colored inks are used in the two ink reservoirs, then the word "Markem" will be printed with one color ink, and the rectangular borderline 87 would be printed with a differently colored ink.

In order to provide for proper coordination of the two ink impressions on the transfer roll, we propose to make one of the type-carrying rolls adjustable in the direction of its axis, and the other adjustable in an angular direction, these two adjustments providing for correctly indexing the two type-carrying rolls so that the two ink impressions will be properly coordinated.

As herein shown, the type-carrying roll 3 is splined to its shaft 6 and is held in position thereon between two clamping nuts 88, 89 that are screw-threaded to the shaft. By adjusting these nuts 88, 89, the roll 3 may be adjusted in the direction of the length of the shaft.

The type-carrying roll 4 is capable of a slight adjustment angularly about its shaft 7, and is nonadjustable in the direction of the length of the shaft. Said roll 4 is clamped between a collar 90 that is fast on the shaft 7 and a clamping collar 91 which is screw-threaded to the shaft. The collar 90 is provided with two radially extending arms 92, and the roll 4 carries a stud 93 extending parallel to the shaft 7 and formed with a flat-sided end 94 which is located between two adjusting screws 95 which are screw-threaded through the arms 92, as best seen in Fig. 7. Each adjusting screw is provided with a lock nut 96 for holding it in adjusted position. By backing off one adjusting screw 95 and screwing up the other, the roll 4 will be turned angularly on the shaft 7. By means of this angular adjustment of the roll 4 and the axial adjustment of the roll 3, it is possible to so correctly adjust both the type-carrying members that the two ink impressions laid on the transfer roll will be in exact register with each other.

Provision is also made herein for adjusting each ink reservoir with its inking roll toward and from the corresponding type-carrying roll.

We have stated above that each ink reservoir is suspended from its supporting stud 37, and that the driving shaft 40 for each inking roll is mounted in a supporting bracket 43. Each supporting bracket 43 is formed with an ear 97 through which the stud shaft 37 extends, each supporting bracket thus being suspended from its stud. Each supporting bracket is located in an opening 98 formed in the upright portion 8 of the frame, and said opening 98 is somewhat larger than the bracket, as shown best in Fig. 11, so as to allow a slight swinging movement of the bracket about its supporting stud shaft 37. Each supporting bracket 43 is provided with two depending arms 99 and 100 which are located either side of a projection 101 extending from the portion 8 of the frame. The arm 100 has an adjusting screw 102 screw-threaded therethrough, the inner end of which engages the ear or projection 101, and a compression spring 103 is located between said ear 101 and the other arm 99, said spring being held in place by a positioning pin 104. By manipulating the adjusting screw 102, the supporting bracket 43 and the ink roll which is coupled thereto may be adjusted in an arc having the stud shaft 37 as a center, thereby providing for adjusting each inking roll toward and from its type-carrying roll. This adjustment is desirable to accommodate any variation in the height of the type with which the type members are provided.

Provision is also made for the adjustment of the type-carrying rolls 3 and 4 toward and from each other so as to secure the proper contact between said rolls and the transfer roll when the latter is inserted into the machine.

Figure 18:
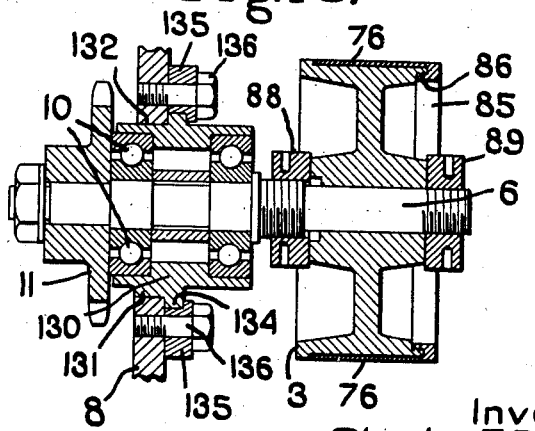
Fig. 18 is a section on the line 18—18, Fig. 17.

One way in which this may be done is illustrated in Figs. 17 and 18, wherein the ball bearings 10 for each of the shafts 6 and 7 are carried by a housing 130, which, in turn, is so mounted in the portion 8 of the frame, that it can be adjusted so as to give vertical movement to the shaft supported thereby. Each of the housings 130 is formed with a circular portion 131 that is eccentric to the shaft 6 and which is received in a circular opening 132 formed in the portion 8 of the frame. With this arrangement, turning movement of either housing 130 in the portion 8 of the frame will give a bodily upward or downward movement to the corresponding shaft 6 or 7 because of the eccentric relation between the axis of the turning movement of the housing 130 and the axis of the shaft supported thereby.

Each housing is formed with a flange 134 which rests against the face of the portion 8 of the frame, and each housing is clamped in its adjusted position by two clamping blocks 135 which are held in their clamping relation by clamping screws 136.

When the clamping screws are loosened, the housings may be then turned to make the desired adjustment, after which the clamping screws will be tightened to clamp the housing in its adjusted position.

In order to keep the sprocket chain 12 under proper tension, we have provided a tensioning sprocket wheel 116 around which the sprocket chain 12 passes and which is mounted on a stud 117 carried by a bracket 118 that is pivoted to the frame at 119. This bracket is acted on by a pulling spring 120, one end of which is anchored to the frame at 121, and the other end of which is connected to the hooked arm 122 of the bracket 118. The tension of the spring tends to swing the sprocket wheel 116 downwardly, and thereby the sprocket chain is held under a uniform and proper tension. This tensioning sprocket wheel also permits the adjustment of the supporting brackets 43 with their sprocket wheels 41 without subjecting the sprocket chain to undue tension or undue slackness. The means for mounting and adjusting the ink reservoirs is not claimed herein, but is made the subject of a divisional application, Serial No. 402,596, filed July 16, 1941.

The means for adjustably mounting the type-carrying members so that they can be moved toward and from each other is not claimed herein, but is made the subject of a divisional application, Serial No. 403,308, filed July 21, 1941.

Similarly, the means for removably mounting each type element on its type-carrying member is not claimed herein, but is made the subject of a divisional application, Serial No. 403,504, filed July 22, 1941.

In addition, the means for supporting the type-carrying members so that they can be adjusted relative to each other to bring them into proper register is not claimed herein, as it is made the basis of a divisional application, Serial No. 402,760, filed July 17, 1941.

While we have illustrated in the drawings one selected embodiment of the invention, yet we do not wish to be limited to the constructional features shown.

We claim:

1. A marking machine comprising a machine frame, a type-carrying member mounted therein, means to give the type-carrying member a cyclic movement, a transfer roll, a holder therefor separable from the machine frame and adapted for manual manipulation, said frame being constructed to support temporarily the holder with the transfer roll in an operative position to receive an ink impression from the type-carrying member, means automatically coupling the transfer roll to the actuating means for the type-carrying member when said transfer roll is placed in its operative position, and means controlled by the holder when the transfer roll is in its operative position to render the actuating means for the type member operative, thereby to actuate both the latter and the transfer roll.

2. A marking machine comprising a machine frame, a rotary type-carrying member mounted therein, means including a one-revolution clutch to rotate the type-carrying member, a transfer roll, a holder therefor separable from the frame and adapted for manual manipulation, said frame being constructed to support temporarily the holder with the transfer roll in an operative position to receive an ink impression from the type-carrying member, means automatically coupling the transfer roll to the actuating means for the type-carrying member when said transfer roll is placed in operative position, and clutch-controlling means rendered operative by the holder when the latter is in its operative position.

3. A marking machine comprising a machine frame, a rotary type-carrying member mounted therein, actuating means, including a clutch, to rotate the type-carrying member, a transfer roll, a holder therefor separable from the frame and adapted for manual manipulation, said frame being constructed to support the holder in an operative position with the type roll in position to receive an ink impression from the type-carrying member and to permit the holder to have a rocking movement about the axis of the transfer roll while so supported, means automatically coupling the transfer roll to said actuating means when said holder is in its operative position, a trip lever for tripping the clutch, and means to actuate the trip lever by the rocking movement of the holder when the latter is in its operative position.

4. A marking machine comprising a frame, a plurality of type-carrying members rotatively mounted therein, actuating mechanism, including a clutch, to rotate said type-carrying members in synchronism, a transfer roll, a holder therefor separable from the frame and adapted for manual manipulation, said frame being constructed to support the holder with the transfer roll in an operative position to receive an ink impression from each type-carrying member, means automatically coupling the transfer roll to the actuating mechanism when said holder is in its operative position, and clutch-controlling means rendered operative by the holder when in such operative position.

5. A marking machine comprising a frame, a plurality of type-carrying members rotatably mounted therein, actuating mechanism to rotate said type-carrying members in synchronism, a transfer roll, a holder therefor separable from the frame, the latter being constructed to support said holder with the transfer roll in an operative position to receive an ink impression from each type-carrying member, means coupling the transfer roll to the actuating mechanism when said holder is in its operative position, and means controlled by the holder when in such operative position to render the actuating mechanism operative for rotating the type-carrying members and transfer roll.

6. A marking machine comprising a frame, a plurality of type-carrying members rotatably mounted therein and each provided with type, actuating means, including a clutch, to rotate said type-carrying members in synchronism, a transfer roll, a holder therefor separable from the frame, the latter being constructed to support the holder with the transfer roll in an operative position to receive an ink impression from each type-carrying member and to permit the holder to rock about the axis of the transfer roll when so supported, means coupling the transfer roll to the actuating mechanism when said holder is in its operative position, and clutch-controlling means rendered operative by rocking movement of the holder when in its operative position, said holder, when removed from the frame, being adapted for manual manipulation to transfer the ink impression carried thereby to the work.

7. A marking machine comprising a machine frame, a type-carrying member mounted therein, means to give the type-carrying member a cyclic movement and to bring it to rest at the end of such movement, a transfer roll, a holder therefor separable from the frame and adapted for manual manipulation, said frame being constructed to support temporarily the holder with the transfer roll in an operative position to receive an ink impression from the type-carrying member, and means controlled by the holder when the transfer roll is in its operative position to render the actuating means for the type-carrying member operative.

CHARLES F. ROBBINS.
DAVID F. PUTNAM.